US012656482B2

(12) United States Patent     (10) Patent No.: US 12,656,482 B2

Wu et al.     (45) Date of Patent:     Jun. 16, 2026

(54) RADAR-BASED DETECTION USING ANGLE OF ARRIVAL ESTIMATION BASED ON PRUNED SPARSE LEARNING OF SUPPORT VECTOR

(71) Applicant: NXP B.V., Eindhoven (NL)

(72) Inventors: Ryan Haoyun Wu, San Jose, CA (US); Jun Li, Brooklyn, NY (US); Maik Brett, Taufkirchen (DE); Michael Andreas Staudenmaier, Munich (DE)

(73) Assignee: NXP B.V., Eindhoven (NL)

( * ) Notice: Subject to any disclaimer, the term of this patent is extended or adjusted under 35 U.S.C. 154(b) by 1514 days.

(21) Appl. No.: 17/185,084

(22) Filed: Feb. 25, 2021

(65) Prior Publication Data

US 2025/0155570 A1     May 15, 2025

(51) Int. Cl.
    *G01S 13/931*     (2020.01)

(52) U.S. Cl.
    CPC ................................. *G01S 13/931* (2013.01)

(58) Field of Classification Search
    None
    See application file for complete search history.

(56) References Cited

U.S. PATENT DOCUMENTS

| | | | |
|---|---|---|---|
| 4,845,500 | A | 7/1989 | Cornett et al. |
| 6,560,445 | B1 | 5/2003 | Fette et al. |
| 8,344,944 | B2 | 1/2013 | Goodman |
| 8,380,770 | B1 | 2/2013 | Nuthalapati |
| 9,157,992 | B2 | 10/2015 | Wang et al. |
| 9,223,015 | B2 | 12/2015 | Kojima |
| 9,271,185 | B2 | 2/2016 | Abdelmonem et al. |
| 9,576,468 | B2 | 2/2017 | Zack et al. |
| 9,628,122 | B1 | 4/2017 | Clark et al. |

(Continued)

FOREIGN PATENT DOCUMENTS

| | | |
|---|---|---|
| CN | 105652273 A | 6/2016 |
| CN | 106054123 A | 6/2016 |

(Continued)

OTHER PUBLICATIONS

English machine translation of Liang et al. (CN 106842113 B) (Year: 2019).*

(Continued)

*Primary Examiner* — Walter L Lindsay, Jr.
*Assistant Examiner* — Geoffrey T Evans

(57)       ABSTRACT

In various examples, a radar system includes a logic circuit with a memory array for processing radar reflection signals. In a specific example, a method includes generating output data indicative of the reflection signals' amplitudes, and discerning angle-of-arrival information for the output data for the output data by correlating the output data with an iteratively-refined estimate of a sparse spectrum support vector ("support vector"). The estimate includes: iteratively updating a set of parameters associated with previous values of the support vector including a covariance estimate, and a statistical expectation among a plurality of support vectors; and pruning, for each iterative update, certain of the plurality of support vectors having amplitudes which are insignificant relative to the statistical expectation of the support vector of in a preceding iteration.

20 Claims, 11 Drawing Sheets

(56) References Cited

U.S. PATENT DOCUMENTS

| | | | |
|---|---|---|---|
| 9,806,747 | B1 | 10/2017 | Clark et al. |
| 9,870,641 | B2 | 1/2018 | Anderson et al. |
| 9,952,720 | B2 | 4/2018 | Schwartz et al. |
| 10,067,221 | B2 | 9/2018 | Ginsburg et al. |
| 10,704,970 | B1 | 7/2020 | Brown et al. |
| 10,879,946 | B1 | 12/2020 | Shima |
| 11,002,837 | B2 | 5/2021 | Barber et al. |
| 11,313,943 | B2 | 4/2022 | Moss et al. |
| 11,394,475 | B1 | 7/2022 | Vaca et al. |
| 11,448,752 | B2 | 9/2022 | Wennersten et al. |
| 11,567,183 | B2 | 1/2023 | Wang et al. |
| 11,644,565 | B2 | 5/2023 | Li et al. |
| 11,681,011 | B2 | 6/2023 | Meissner et al. |
| 2009/0009661 | A1 | 1/2009 | Murakami et al. |
| 2012/0026031 | A1 | 2/2012 | Goodman |
| 2012/0249476 | A1 | 10/2012 | Schwartz et al. |
| 2013/0201054 | A1 | 8/2013 | Wang et al. |
| 2013/0342383 | A1 | 12/2013 | Kojima |
| 2014/0182361 | A1 | 7/2014 | Bargatin et al. |
| 2014/0274094 | A1 | 9/2014 | Abdelmonem et al. |
| 2015/0198713 | A1 | 7/2015 | Boufounos et al. |
| 2015/0279082 | A1 | 10/2015 | Anderson et al. |
| 2016/0291130 | A1 | 10/2016 | Ginsburg et al. |
| 2016/0379475 | A1 | 12/2016 | Zack et al. |
| 2017/0010344 | A1 | 1/2017 | Corbett |
| 2017/0149147 | A1 | 5/2017 | Minami et al. |
| 2018/0106889 | A1 | 4/2018 | Schuck et al. |
| 2018/0356495 | A1 | 12/2018 | Moss et al. |
| 2019/0011533 | A1 | 1/2019 | Ginsburg et al. |
| 2020/0161775 | A1 | 5/2020 | Zhu et al. |
| 2020/0200861 | A1 | 6/2020 | Alawsh et al. |
| 2020/0321710 | A1 | 10/2020 | Shtrom et al. |
| 2021/0018604 | A1 | 1/2021 | Barber et al. |
| 2021/0149042 | A1 | 5/2021 | Weenersten et al. |
| 2021/0318424 | A1 | 10/2021 | Wang et al. |
| 2021/0373144 | A1 | 12/2021 | Amani et al. |

FOREIGN PATENT DOCUMENTS

| | | | | |
|---|---|---|---|---|
| CN | 106019213 | A | 10/2016 | |
| CN | 104749553 | B | 3/2017 | |
| CN | 105182293 | B | 7/2017 | |
| CN | 109061556 | A | 12/2018 | |
| CN | 106842113 | B * | 6/2019 | ............... G01S 3/00 |
| CN | 111580039 | A | 8/2020 | |
| CN | 111610512 | A | 9/2020 | |
| EP | 3 588 128 | A1 | 6/2018 | |
| EP | 3 712 654 | A1 | 9/2020 | |
| GB | 2565824 | A | 2/2019 | |
| JP | 2020106397 | | 7/2020 | |
| WO | 2019106656 | A1 | 6/2019 | |

OTHER PUBLICATIONS

Non Final Office Action: U.S. Appl. No. 17/185,162; 12 pages (Dec. 14, 2022).

Final Office Action: U.S. Appl. No. 17/245,613; 17 pages (Aug. 2, 2023).

Notice of Allowance; U.S. Appl. No. 17/185,040; 14 pages (Aug. 7, 2023).

Y.D. Zhang, M. G. Amin and B. Himed, "Sparsity-based DOA Estimation Using Co-prime Arrays", 2013 IEEE International Conference on Acoustics, Speech and Signal Processing, Vancouver, BC, 2013, pp. 3967-3971.

Karabulut, G., Kurt, T. & Yongacoglu, A. "Estimation of Direction of Arrival by Matching Pursuit (EDAMP)". J Wireless Com Network 2005, 197-205.

P. Gerstoft, C.F. Mecklenbrauker, A. Xenaki and S. Nannuru, "Multisnapshot Sparse Bayesian Learning for DOA," in IEEE Signal Processing Letter, vol. 23, No. 10, Oct. 2016, pp. 1469-1473.

M. D. Sacchi, T. J. Ulrych and C. J. Walker, "Interpolation and extrapolation using a high-resolution discrete Fourier transform," in IEEE Transactions on Signal Processing, vol. 46, No. 1, Jan. 1998, pp. 31-38.

Applicant respectfully refers the Examiner to concurrently-filed U.S. patent applications of the common Applicant/Assignee, U.S. Appl. Nos. 17/185,040, 17/185,162, and 17/185,115, each filed on Feb. 25, 2021. No Attachment.

Non Final Office Action: U.S. Appl. No. 17/185,040; 40 pages (Apr. 6, 2023).

Non Final Office Action: U.S. Appl. No. 17/245,613; 33 pages (Apr. 5, 2023).

Wang, Jianping; "CFAR-Based Interference Mitigation for FMCW Automotive Radar Systems"; Arixiv.org, Cornell University Library, Ithaca, NY; 10 pages (Jan. 4, 2021).

J. Bechter and C. Waldschmidt. "Automotive Radar Interference Mitigation by Reconstruction and Cancellation of Interference Component," 2015 IEEE MTT-S International Conference on Microwaves for Intelligent Mobility, 4 pgs. Apr. 27-29, 2015.

J. Bechter et al. "Automotive Radar Interference Mitigation using a Sparse Sampling Approach," Proceedings of the 14th European Radar Conference, Nuremberg, Germany, pp. 90-94, Oct. 11-13, 2017.

U.S. Appl. No. 17/245,613, filed Apr. 30, 2021, entitled "Radar Communication With Interference Suppression".

Non Final Office Action: U.S. Appl. No. 17/245,613; 18 pages (Nov. 6, 2023).

Petros T Boufounos et al; "Sparse MIMO Architectures For Through-the wall Imaging"; IEEE 8th Sensor Array and Multichannel Signal Processing Workshop; 4 pages (Petros T Boufounos et al "Sparse MIMO Architectures For Through-the wall Imaging" 2014 IEEE 8th Sensor Array and Multichannel Signal Processing Workshop; (4 pages).

Chen, Zhimin et al; "A Robust Sparse Bayesian Learning-Based DOA Estimation Method With Phase Calibration"; IEEE Access, IEEE, USA, vol. 8; pp. 141511-0141522 (Jul. 31, 2020).

Huang, Qinghua et al; "Real-Valued DOA Estimation for Sperical Arrays Using Sparse Bayesian Learning"; Elsevier, Signal Processing, 125; 8 pages (Jan. 26, 2016).

Mishra, Amrita et al; "Sparse Bayesian Learning-Based Target Imaging and Parameter Estimation for Monostatic MIMO Radar Systems"; IEEE Access vol. 6; pp. 68545-68559, vol. 6; (Nov. 9, 2018).

Moghadam, Goudarz Saadati et al; "Novel Method for Digital Beamforming in Co-prime Sensor Arrays Using Product and Min Processors"; IET Journals, IET Signal Processing; 10 pages (Jun. 24, 2019).

Lei, Sun et al; "Direction-of-Arrival Estimation Based on Modified Bayesian Compressive Sensing Method"; IEEE 4 pages (2011).

Notice of Allowance; U.S. Appl. No. 17/185,115; 13 pages (Nov. 9, 2023).

Athley, Fredrik et al; "Model-Based Detection and Direction of Arrival Estimation in Radar Using Sparse Arrays"; Conf. Record of the 38th Asilomar Conf. on Signals, Systems and Computers, Pacific Grove, CA USA; vol. 2; pp. 1953-1957 (Nov. 2004).

Xu, Di et al; "Optimization Design of CS-MIMO Radar Sparse Random Array"; 2016 CIE Int'l Conf. on Radar, Guangzhou, China; 4 pages (2016).

* cited by examiner

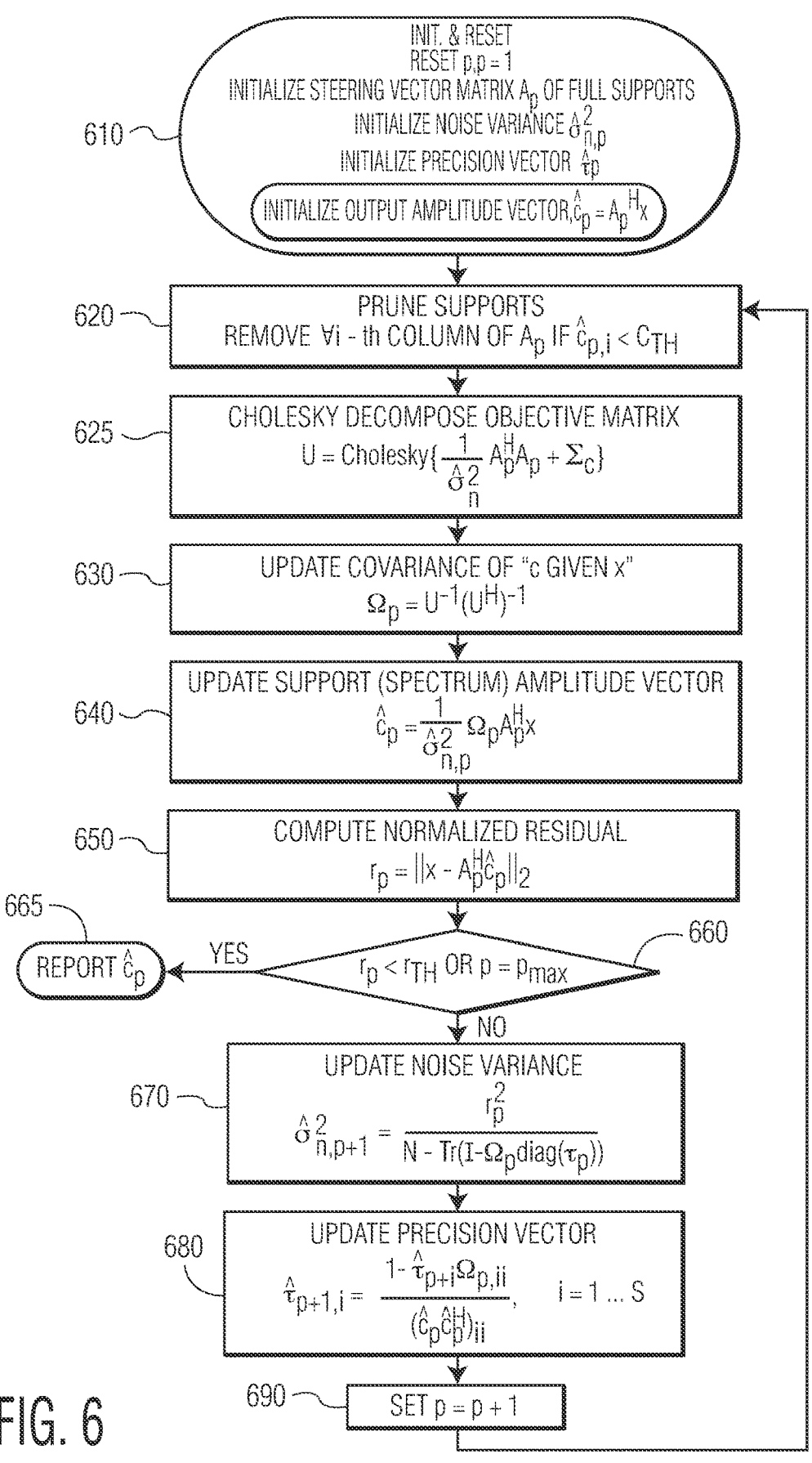

610 — INIT. & RESET
RESET p,p = 1
INITIALIZE STEERING VECTOR MATRIX $A_p$ OF FULL SUPPORTS
INITIALIZE NOISE VARIANCE $\hat{\sigma}^2_{n,p}$
INITIALIZE PRECISION VECTOR $\hat{\tau}_p$
INITIALIZE OUTPUT AMPLITUDE VECTOR, $\hat{c}_p = A_p^H x$ 620 — PRUNE SUPPORTS
REMOVE $\forall$ i - th COLUMN OF $A_p$ IF $\hat{c}_{p,i} < C_{TH}$ 625 — CHOLESKY DECOMPOSE OBJECTIVE MATRIX
$U = \text{Cholesky}\{\frac{1}{\hat{\sigma}^2_n} A_p^H A_p + \Sigma_c\}$ 630 — UPDATE COVARIANCE OF "c GIVEN x"
$\Omega_p = U^{-1}(U^H)^{-1}$ 640 — UPDATE SUPPORT (SPECTRUM) AMPLITUDE VECTOR
$\hat{c}_p = \frac{1}{\hat{\sigma}^2_{n,p}} \Omega_p A_p^H x$ 650 — COMPUTE NORMALIZED RESIDUAL
$r_p = \|x - A_p^H \hat{c}_p\|_2$ 665 — REPORT $\hat{c}_p$     YES ← 660     $r_p < r_{TH}$ OR $p = p_{max}$

NO

670 — UPDATE NOISE VARIANCE
$\hat{\sigma}^2_{n,p+1} = \frac{r_p^2}{N - \text{Tr}(I - \Omega_p \text{diag}(\tau_p))}$ 680 — UPDATE PRECISION VECTOR
$\hat{\tau}_{p+1,i} = \frac{1 - \hat{\tau}_{p+i} \Omega_{p,ii}}{(\hat{c}_p \hat{c}_p^H)_{ii}}$,     $i = 1 \dots S$ 690 — SET $p = p + 1$

FIG. 6

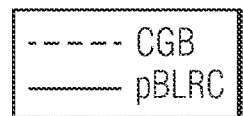
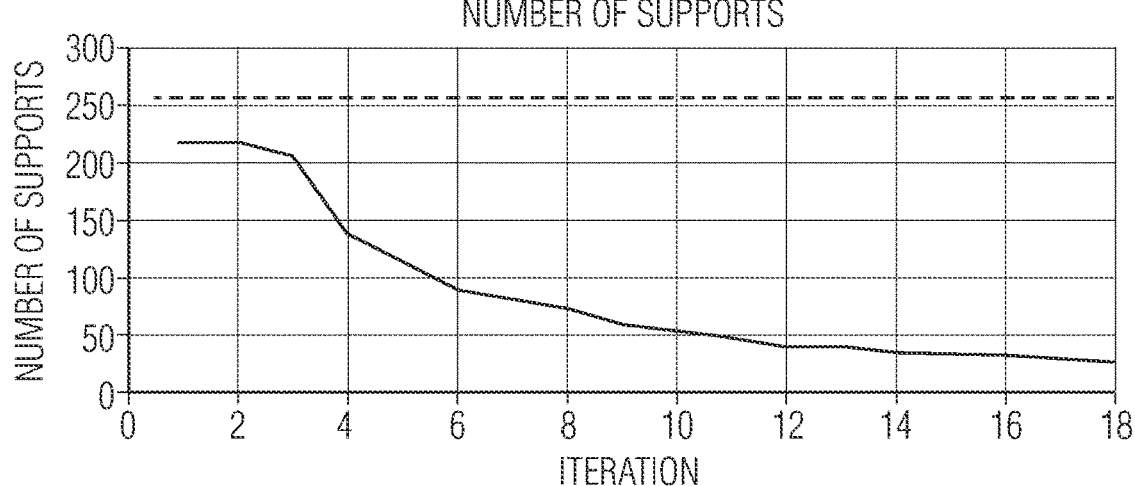
FIG.7A
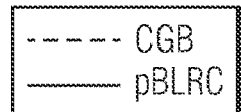
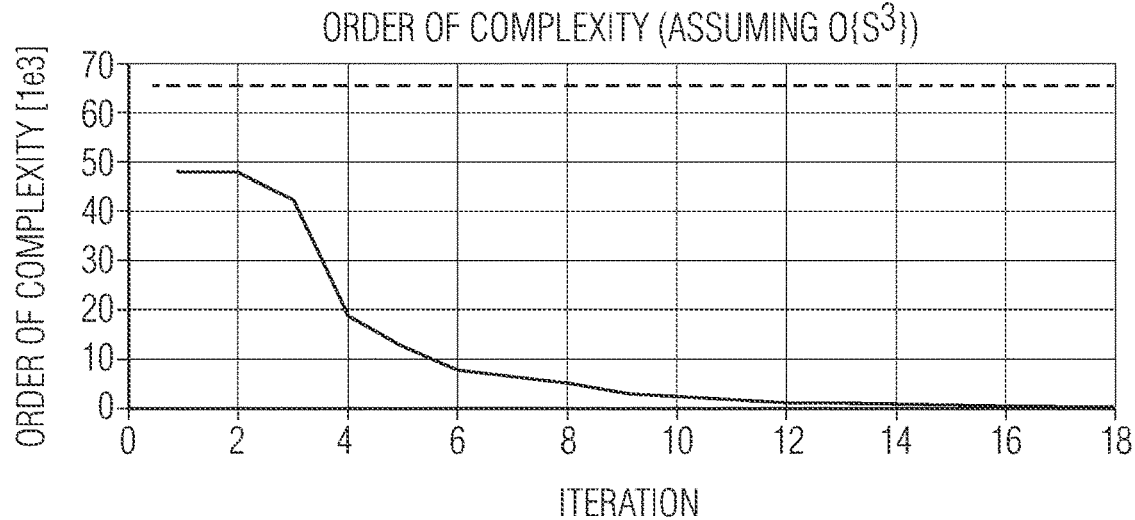
FIG.7B

RADAR-BASED DETECTION USING ANGLE OF ARRIVAL ESTIMATION BASED ON PRUNED SPARSE LEARNING OF SUPPORT VECTOR

OVERVIEW

Aspects of various embodiments are directed to radar apparatuses/systems and related methods.

In certain radar signaling applications including but not limited to automotive and autonomous vehicle applications, high spatial resolution may be desirable for detecting and distinguishing objects which are perceived as being located at the similar distances and/or moving at similar velocities. For instance, it may be useful to discern directional characteristics of radar reflections from two or more objects that are closely spaced, to accurately identify information such as location and velocity of the objects.

Virtual antenna arrays have been used to mitigate ambiguity issues with regards to apparent replicas in discerned reflections as indicated, for example, by the amplitudes of corresponding signals as perceived in the spatial resolution spectrum (e.g., amplitudes of main lobes or "grating lobes"). But even with many advancements in configurations and algorithms involving virtual antenna array, radar-based detection systems continue to be susceptible to ambiguities and in many instances yield less-than optimal or desirable spatial resolution. Among these advancements, virtual antenna arrays have been used with multiple-input multiple-output (MIMO) antennas among other type of known arrays to achieve a higher spatial resolution, but such approaches can be challenging to implement successfully, particularly in rapidly-changing environments such as those involving automobiles travelling at relatively high speeds.

These and other matters have presented challenges to efficiencies of radar implementations, for a variety of applications.

SUMMARY

Various example embodiments are directed to issues such as those addressed above and/or others which may become apparent from the following disclosure concerning radar devices and systems in which objects are detected by sensing and processing reflections or radar signals for discerning location information and related information including as examples, distance, angle-of-arrival and/or speed information.

In certain example embodiments, aspects of the present disclosure are directed to radar-based processing circuitry configured to solve for a sparse array AoA (angle of arrival) estimation problem in which ambiguities may be recognized and overcome for an accurate AoA estimation while also accounting for data processing throughput and computation resources. More specific aspects of the present disclosure are directed to overcoming the estimation problem by carrying out a set of steps which help to account for measurement errors and noise by iteratively updating measurement-error and noise parameters, and with the set up steps using a matrix-based model in which each of the possible spectrum support vectors is drawn from a distinct distribution, for example, as may be used in known Sparse Bayesian Models in automatic relevance determination methodologies.

In more specific example embodiments, the present disclosure is directed to a method and/or an apparatus involving a radar system having a logic circuit and a memory array (e.g., MIMO array in which at least one uniform sparse linear array may be embedded) for processing radar reflection signals. Various steps or actions carried out by the radar logic circuitry include generating output data indicative of the reflection signals' amplitudes, and discerning angle-of-arrival information for the output data for the output data by correlating the output data with an iteratively-refined estimate of a sparse spectrum support vector ("support vector"). The estimate includes: iteratively updating of a set of parameters associated with previous values of the support vector including a covariance estimate, and a statistical expectation among a plurality of support vectors; and pruning, for each iterative update, certain of the plurality of support vectors having amplitudes which are insignificant relative to the statistical expectation of the support vector of in a preceding iteration.

In other more specific examples, the above examples may involve one or more of the following aspects (e.g., such additional aspects being used alone and/or in any of a variety of combinations). The sparse spatial frequency support vector may be processed as a random variable using a matrix-based model, and with the matrix-based model processed by Cholesky decomposition with each iterative update, so as to reduce computational burdens. The steps may be carried out sequentially, without inversion of a matrix in the matrix-based model, with the update of the statistical expectation of the support vector following the update of the covariance estimate of the support vector, and the update of the noise variance parameter following the update of the statistical expectation of the support vector. Further, the set of parameters may include a noise variance parameter, and a precision vector associated with a random variable $\tau$ such that the conditional probability of the support vector in a current iterative update, given $\tau$, is a joint Gaussian distribution, and the conditional probability of $\tau$ itself is a Gamma distribution with multiple parameters chosen to promote sparse outcomes for the iteratively-refined estimate.

In the above examples and/or other specific example embodiments, further aspects are as follows. The iterative updating of the parameters may be carried out over an increasing iteration count which stops upon reaching or satisfying a threshold criteria which may be a function of the multiple parameters and/or a function of a measurement error having a Gaussian distribution. In response to the threshold criteria, resultant data may be generated to provide the discerned angle-of-arrival information as an output. Also, the measurement error may correspond to an error probability given the constraint of the support vector after its most recent iterative update. Further, to increase the accuracy, the array may have at least two embedded arrays, each of which is being associated with a unique antenna-element spacing from among a set of unique co-prime antenna-element spacings.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 6 is a flow chart showing one example manner in which certain more specific aspects of the present disclosure may be carried out; and FIGS. 7A and 7B are respective plots comparing numbers of support vectors in a first known type of iterative process referred to as Sparse Bayesian Learning and in a second yet type of iterative process which is consistent with example methodology according to the present disclosure.

Figure 1A:
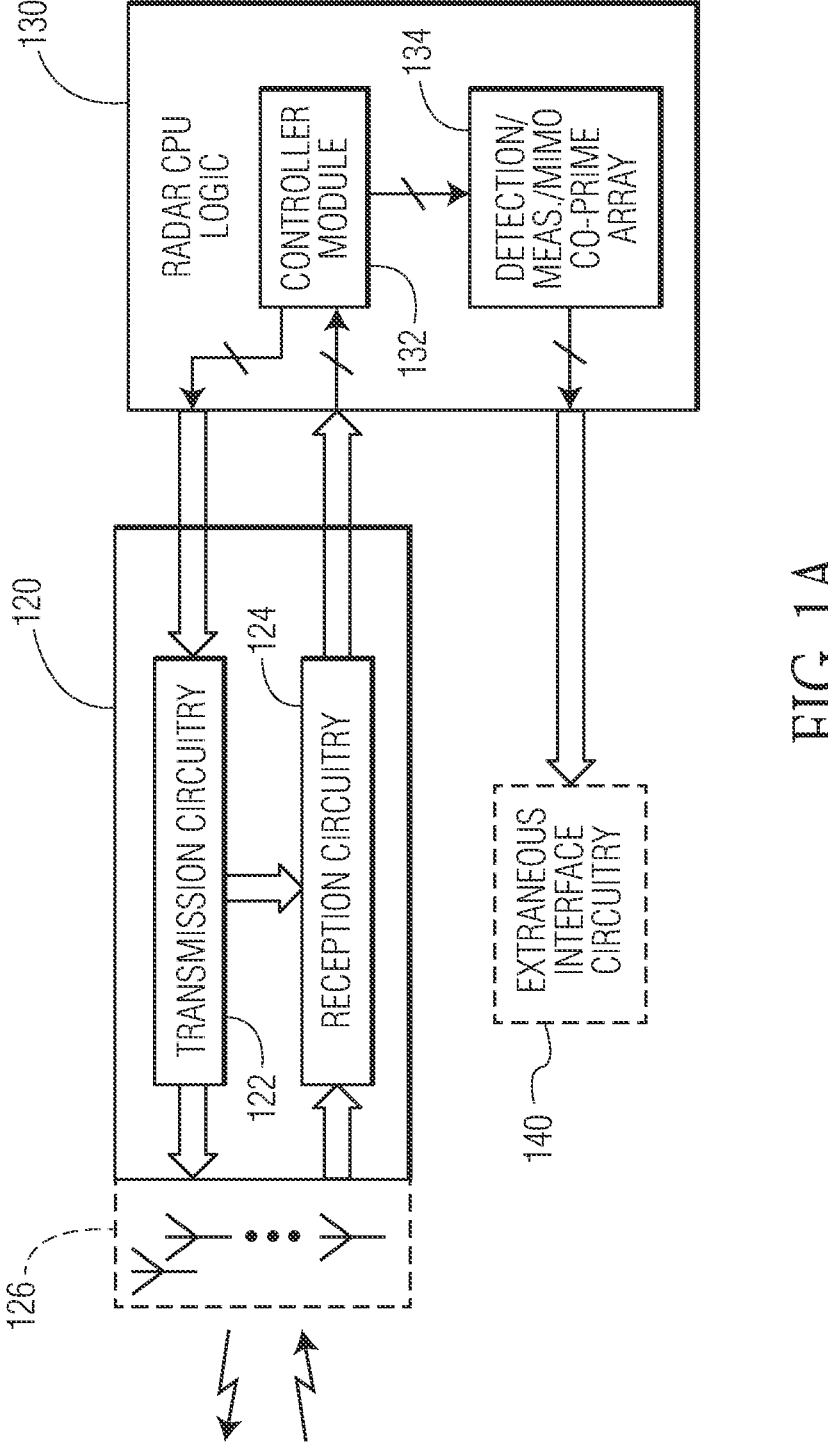
FIG. 1A is a system-level diagram of a radar-based object detection circuit, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar systems and related communications. In certain implementations, aspects of the present disclosure have been shown to be beneficial when used in the context of automotive radar in environments susceptible to the presence of multiple objects within a relatively small region. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In a particular embodiment, a radar-based system or radar-detection circuit may include a radar circuit front-end with signal transmission circuitry to transmit radar signals and with signal reception circuitry to receive, in response, reflection signals as reflections from objects which may be targeted by the radar-detection circuit or system. In processing of data corresponding to the reflection signals, logic or computer-processing circuitry solves for a sparse array AoA (angle of arrival) estimation problem in which ambiguities may be recognized and overcome for an accurate AoA estimation. For a more accurate estimation, the circuitry should also account for measurement errors and noise, while also respecting data-processing throughput and computation-resource goals associated with practicable designs.

In a more specific example, aspects of the present disclosure are directed to overcoming the estimation problem by carrying out a set of steps which help to account for such measurement errors and noise by iteratively updating measurement-error and noise parameters, and by using a matrix-based model in which each of the possible spectrum support vectors is drawn from a distinct distribution, for example, as may be used in known Sparse Bayesian models in automatic relevance determination methodologies.

In a particular embodiment, a radar-based system or radar-detection circuit may include a multi-input multi-output (MIMO) array, embedded with one or multiple uniform sparse linear arrays, to process the reflection-related signals. From the MIMO array, output data is presented as measurement vectors, indicative of signal magnitudes associated with the reflection signals, to another module for discerning angle-of-arrival (AoA) information.

The logic or computer processing circuitry associated with this AoA module determines or estimates the AoA information by correlating the output data with at least one spatial frequency support vector indicative of a correlation peak for the output data. For example, in one specific method, this determination or estimation is realized by iteratively updating of a set of parameters associated with previous values of the support vector including a covariance estimate, and a statistical expectation among a plurality of support vectors (e.g., an average or a median vector or another middle-ground selection taken from within a limited range such as the mean or median plus and/or minus seven percent); and pruning, for each iterative update, certain of the plurality of support vectors having amplitudes which are insignificant relative to the statistical expectation of the support vector of in a preceding iteration.

Certain more particular aspects of the present disclosure are directed to such use and/or design of the AoA module in response to such output data from a multi-input multi-output (MIMO) array which, as will become apparent, may be implemented in any of a variety of different manners, depending on the design goals and applications. Accordingly given that the data flow and related processing operations in such devices and systems is perceived as being performed in connection with the MIMO array first, in the following discussion certain optional designs of the MIMO array are first addressed and then the discussion herein shifts to such particular aspects involving use and/or design of the AoA module.

Among various exemplary designs consistent with the present disclosure, one specific design for the MIMO array has it arranged to include a plurality of embedded sparse linear arrays, with each such array being associated with a unique antenna-element spacing from among a set of unique co-prime antenna-element spacings. As will become apparent, such co-prime spacings refer to numeric value assignments of spacings between antenna elements, wherein two such values are coprime (or co-prime) if the only positive integer (factor) that divides both of them is 1; therefore, the values are coprime if any prime number that divides one does not divide the other. As a method in use, such a radar-based circuit or system transmits radar signals and, in response, receives reflection signals as reflections from targeted objects which may be in a particular field of view. The MIMO virtual array provides processing of data corresponding to the reflections by using at least two MIMO-embedded sparse linear arrays, each being associated with one such unique antenna-element spacing. In other designs for the MIMO array, there are either embedded uniform sparse linear array and/or multiple, each being associated with a unique antenna-element spacing which may or may not be necessarily selected from among set of unique co-prime antenna-element spacings.

These unique co-prime antenna-element spacings may be selected to cause respective unique grating lobe centers along a spatially discrete sampling spectrum, so as to facilitate differentiating lobe centers from side lobes, as shown in experiments relating to the present disclosure. In this context, each sparse linear arrays may have a different detectable amplitude due to associated grating lobe centers not coinciding and mitigating ambiguity among side lobes adjacent to the grating lobe centers. In certain more specific examples also consistent with such examples of the present disclosure, the grating lobe center of one such sparse linear array is coincident with a null of the grating lobe center of another of the sparse linear arrays, thereby helping to distinguish the grating lobe center and mitigate against ambiguous measurements and analyses.

In various more specific examples, the MIMO virtual array may include various numbers of such sparse linear arrays (e.g., two, three, several or more such sparse linear arrays). In each such example, there is a respective spacing value associated with each of the sparse linear arrays and collectively, these respective spacing values form a co-prime relationship. For example, in an example wherein the MIMO virtual array includes two sparse linear arrays, there are two corresponding spacing values that form a co-prime relationship which is a co-prime pair where there are only two sparse linear arrays.

In other specific examples, the present disclosure is directed to radar communication circuitry that operates with first and second (and, in some instances, more) uniform MIMO antenna arrays that are used together in a non-uniform arrangement, and with each such array being associated with a unique antenna-element spacing from among a set of unique co-prime antenna-element spacings that form a co-prime relationship (as in the case of a co-prime pair). The first uniform MIMO antenna array has transmitting antennas and receiving antennas in a first sparse arrangement, and the second uniform MIMO antenna array has transmitting antennas and receiving antennas in a different sparse arrangement. The radar communication circuitry operates with the first and second MIMO antenna arrays to transmit radar signals utilizing the transmitting antennas in the first and second MIMO arrays, and to receive reflections of the transmitted radar signals from an object utilizing the receiving antennas in the first and second MIMO arrays. Directional characteristics of the object relative to the antennas are determined by comparing the reflections received by the first MIMO array with the reflections received by the second MIMO array during a common time period. Such a time period may correspond to a particular instance in time (e.g., voltages concurrently measured at feed points of the receiving antennas), or a time period corresponding to multiple waveforms. The MIMO antennas may be spaced apart from one another within a vehicle with the radar communication circuitry being configured to ascertain the directional characteristics relative to the vehicle and the object as the vehicle is moving through a dynamic environment. An estimate of the DOA may be obtained and combined to determine an accurate DOA for multiple objects.

The reflections may be compared in a variety of manners. In some implementations, a reflection detected by the first MIMO array that overlaps with a reflection detected by the second MIMO array is identified and used for determining DOA. Correspondingly, reflections detected by the first MIMO array that are offset in angle relative to reflections detected by the second MIMO array. The reflections may also be compared during respective instances in time; and used together to ascertain the directional characteristics of the object. Further, time and/or space averaging may be utilized to provide an averaged comparison over time and/or space (e.g., after covariance matrix spatial smoothing).

Figure 1B:
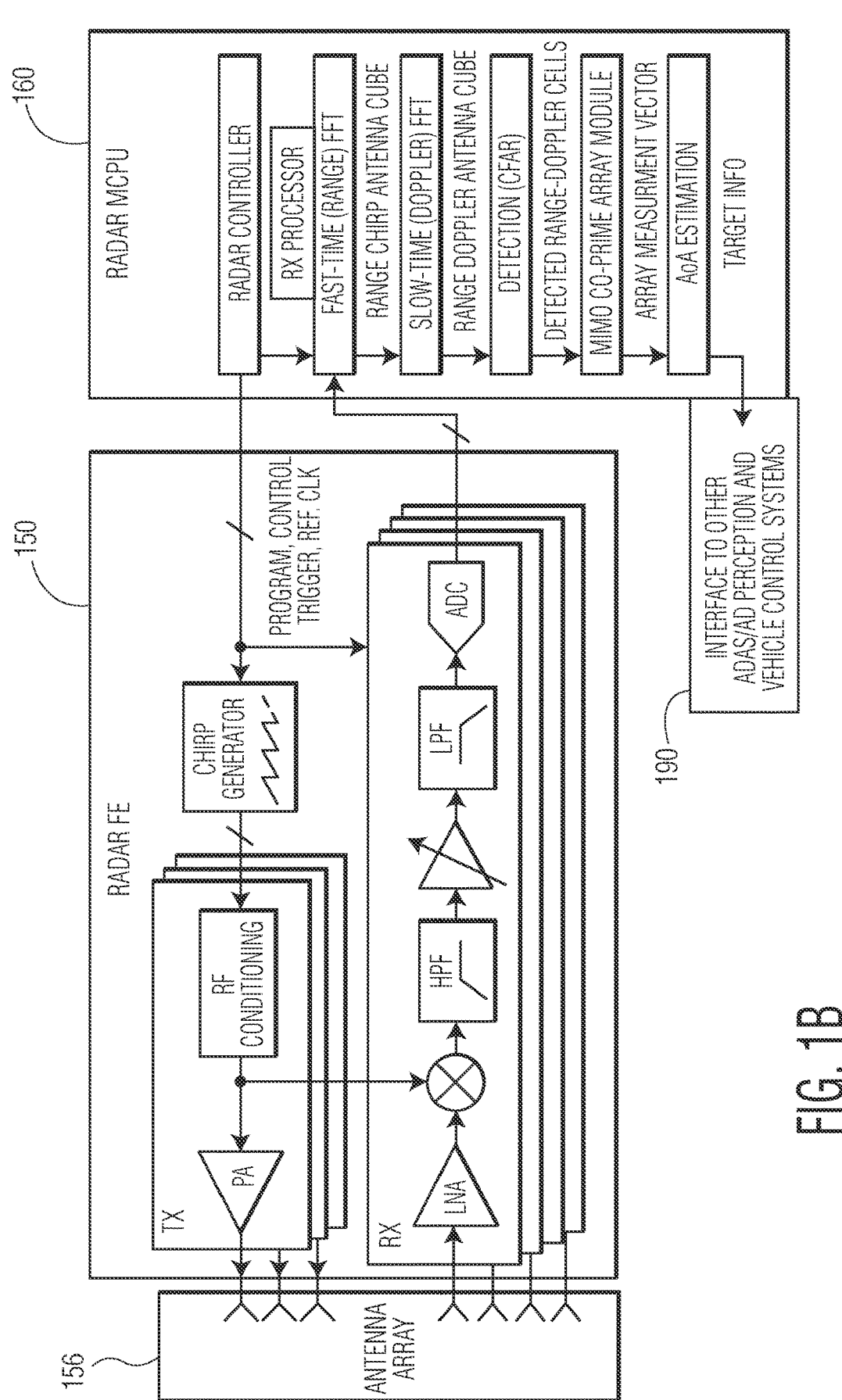
FIG. 1B is another system-level diagram of a more specific radar-based object detection circuit, in accordance with the present disclosure.

In accordance with the present disclosure, FIGS. 1A and 1B are block diagrams to illustrate examples of how such above-described aspects and circuitry may be implemented. Bearing in mind that aspects of the present disclosure are applicable to a variety of radar applications which use MIMO-based technology and different modulation schemes and waveforms, FIG. 1A may be viewed as a generalized functional diagram of a Linear Frequency Modulation (LFM) automotive MIMO radar involving a radar-based detection transceiver having a radar circuit and a MIMO virtual array such as described in one of the examples above.

More specifically, in the example depicted in FIG. 1A, the radar circuit includes a front end 120 with signal transmission circuitry 122 to transmit radar signals and with signal reception circuitry 124 to receive, in response, reflection signals as reflections from objects (not shown). Antenna elements, as in the examples above, are depicted in block 126 via dotted lines as part of the front end 120 or as a separate portion of the radar device. Logic circuitry 130 may include CPU and/or control circuitry 132 for coordinating the signals to and from the front end circuitries 122 and 124, and may include a MIMO virtual array as part of module 134. In many examples, the MIMO virtual array provides an output that is used to estimate AoA information and, therefore, in this example, module 134 is depicted as having a MIMO virtual array and a detection/measurement aspect.

After processing via the MIMO virtual array via its sparse linear arrays (each with unique co-prime antenna-element spacing values), the module 134 may provide an output to circuitry/interface 140 for further processing. As an example, the circuitry/interface 140 may be configured with circuitry to provide data useful for generating high-resolution radar images as used by drive-scene perception processors for various purposes; these may include one or more of target detection, classification, tracking, fusion, semantic segmentation, path prediction and planning, and/or actuation control processes which are part of an advanced driver assistance system (ADAS), vehicle control, and autonomous driving (AD) system onboard a vehicle. In certain specific examples, the drive scene perception processors may be internal or external (as indicated with the dotted lines at 140) to the integrated radar system or circuit.

The example depicted in FIG. 1B shows a more specific type of implementation which is consistent with the example of FIG. 1A. Accordingly in FIG. 1B, the radar circuit includes a front end 150 with transmit and receive paths as with the example of FIG. 1A. The transmit path is depicted, as in the upper portion of FIG. 1B, with including a bus for carrying signals used to configure/program, to provide control information such as for triggering sending and sampling of send and receive signals and a reference clock signal which may be used to time-align (or synchronize) such activities between the transmit and receive paths of the front end 150. These signals are used to transmit radar signals, via a chirp generation circuit and RF (radio or radar frequency) conditioning-amplification circuits as are known in many radar communications systems. In the example of FIG. 1B, multiple conditioning-amplification circuits are shown driving respectively arranged transmit antenna elements within an antenna array block 156. In certain contexts, the antenna array block 156 may be considered part of or separate from the front end 150.

The antenna array block 156 also has respectively arranged receive antenna elements for receiving reflections and presenting corresponding signals to respective amplifiers which provide outputs for subsequent front-end processing. As is conventional, this front-end processing may include mixing (summing or multiplying) with the respective outputs of the conditioning-amplification circuits, high-pass filtering, further amplification following by low-pass filtering and finally analog-to-digital conversion for presenting corresponding digital versions (e.g., samples) of the front end's processed analog signals to logic circuitry 160.

The logic circuitry 160 in this example is shown to include a radar controller for providing the above-discussed control/signal bus, and a receive-signal processing CPU or module including three to five functional submodules. In this particular example, the first three of these functional submodules as well as the last such submodule (which is an AoA estimation module as discussed with FIG. 1A) are may be conventional or implemented with other advancements. These first three submodules are: a fast-time FFT (fast-Fourier transform) block for generating object-range estimations and providing such estimations to a range-chirp antenna cube; a slow-time FFT block for Doppler estimations as stored in range-Doppler antenna cube; and a detection block which uses the previous block to generate data associated with objects detected as being in (range-Doppler) cells.

The fourth submodule in this example is a MIMO co-prime array module which, as discussed above, may be implemented using at least two MIMO-embedded sparse linear arrays, each being associated with one such unique antenna-element spacing, such as with values that manifest a co-prime relationship.

Figure 2:
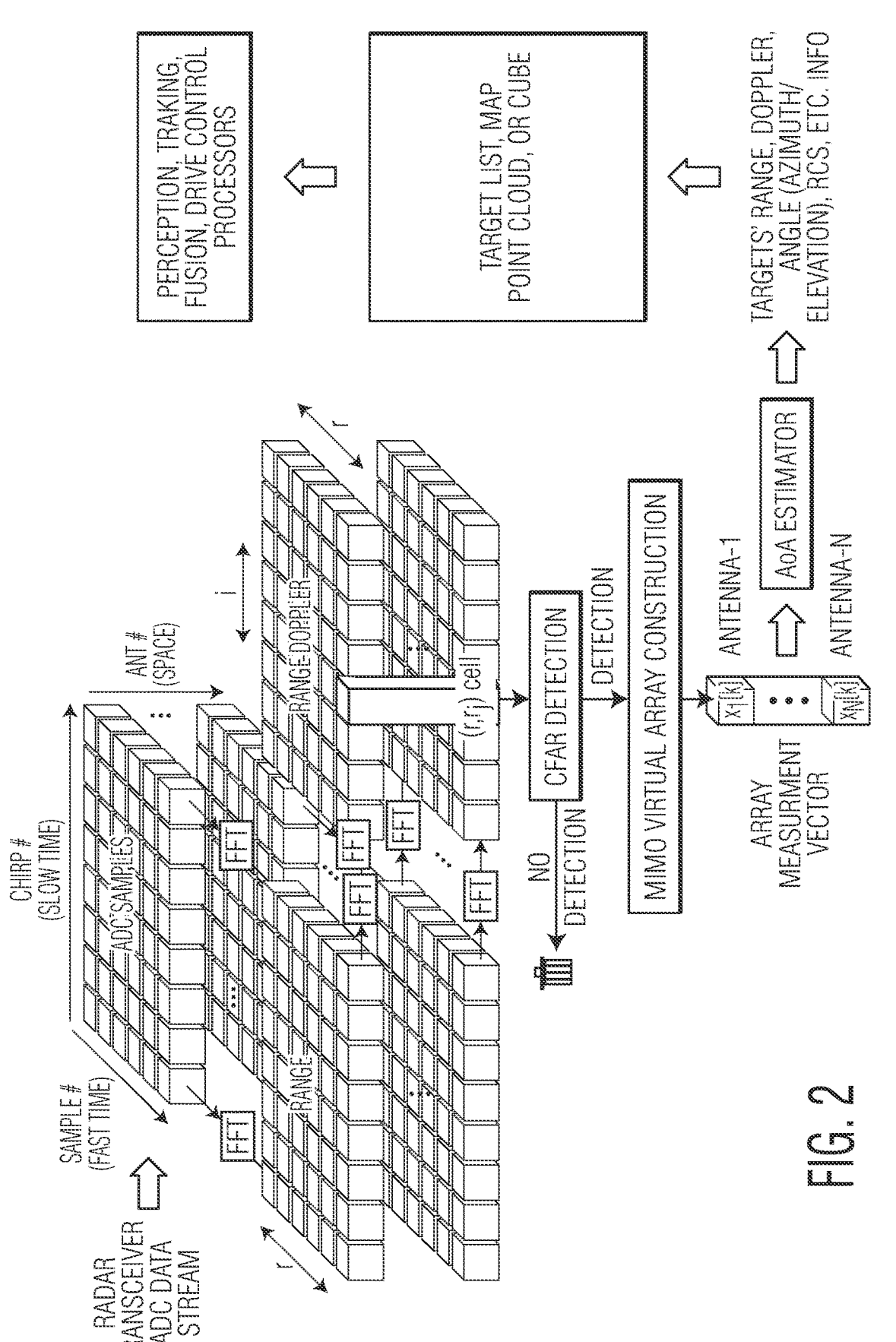
FIG. 2 is a signal-flow diagram illustrating an exemplary set of activities for a system of the type implemented in a manner consistent with FIGS. 1 and 2, in accordance with the present disclosure.

Consistent with the logic circuitry 160, FIG. 2 is a block diagram showing data flow for a LFM MIMO automotive radar receiver and specifically for the processing chain for data from the ADC data signal such as in FIG. 1B. Upon receiving the ADC sample stream from the radar transceiver, the chirp data is first processed for range spectrum using FFT accelerators, and the accumulated range-chirp map then processed over the chirp dimension with another FFT to produce Doppler spectrum and produces the produce Range Doppler map for each channel. Detection may use any of various implementations such as via a CFAR (adaptive constant false alarm rate) algorithm to detect the presence of targets in certain cells. For each detected range-Doppler cell, the MIMO virtual array may be constructed according to specific MIMO waveform processing requirements and may be used to produce an array measurement vector that is ready for AoA estimation processing. Such an AoA Estimator may then process the array measurement vector and produce target position information for use by subsequent circuits or systems (e.g., for data logging, display, and downstream perception, fusion, tracking, drive control processing).

In such examples using such a memory array (e.g., MIMO) for a co-prime array, as in the module of the logic circuitry 160, an advantageous aspect of concerns the suppression of spurious sidelobes as perceived in the spatial resolution spectrum in which the amplitudes of main lobes or "grating lobes" are sought to be distinguished and detected. Spurious sidelobes are suppressed by designing the MIMO co-prime array module as a composite array including at least two uniform linear arrays (ULA) with co-prime spacings. By using co-prime spacing, ambiguities caused by the sidelobes are naturally suppressed. The suppression grows stronger when the composite ULA is extended to larger sizes by adding additional MIMO-based transmitters via each additional ULA, as the suppression of spurious sidelobes may be limited by the size of the two composite ULAs. In the cases where higher suppression is desirable to achieve better target dynamic range, further processing may be implemented.

In experimentation/simulation efforts leading to aspect of the present disclosure, comparisons of a 46-element uniform linear array (ULA) and a 16-element sparse array (SPA) of 46-element aperture has shown that the SPA and ULA have similar aperture parameters but the spatial under sampling of the SPA results in many ambiguous spurious sidelobes, and that further reducing the amplitudes of the spurious sidelobes results in a significant reduction of targets (or object) being falsely identified and/or located. In such a spatial resolution spectrum, the amplitude peaks in the spectrum corresponds to detected targets.

A more specific example of the present disclosure is directed to further mitigating the spurious sidelobe issues by setting up the issues using probability theories having related probability solutions. Using the sparsity constraint imposed upon the angular spectrum, such issues are known as L-1 Norm minimization problems. Well-known techniques such as Orthogonal Matching Pursuit (OMP) may be used for resolving the sparse angular spectrum; however, the performance is impacted by the sensitivity to array geometry and support selection, sensitivity to angle quantization, and/ or the growing burden of least-squares (LS) computation as more targets are found. Alternatively and as a further aspect of the present disclosure, such performance may be improved by mitigating the angle quantization problem to a large degree by carrying out a set of steps which, as noted above, help to account for measurement errors and noise by iteratively updating measurement-error and noise parameters. These steps may use a matrix-based model in which each of the possible spectrum support vectors is drawn from a distinct distribution, for example, as may be used in known Sparse Bayesian Models in automatic relevance determination methodologies.

Before further discussing these steps, the discussion first explains how such a MIMO array may be used, according to various optional aspects of the present disclosure, to develop and generated the output data used by the AoA estimation module (e.g., 134 of FIG. 1A or as within block 160 of FIG. 1B). One such aspect concerns the extendibility of such a MIMO co-prime sparse array. For MIMO radars, AoA estimation is based on the reconstructed MIMO virtual array's outputs. In a MIMO radar system, the equivalent position of a virtual antenna element can be obtained by summing the position vectors of the transmitting antenna and receiving antenna. As the result, the virtual array consists of repeating antenna position patterns of the Rx antenna array centered at the Tx antenna positions (or vice versa). Because of the array geometry repeating nature, for MIMO radar system, it is not possible to construct arbitrary sparse array pattern. With this limitation of reduced degrees of freedom, the sidelobe suppression becomes more difficult.

Optionally, the above-described MIMO array may be constructed to result in sidelobe suppression being repeatable (i.e., extendable via MIMO Tx) antenna geometry. The constructed MIMO virtual array consists of 2 embedded ULAs each with a unique element spacing. First, the two element spacing values are selected such that they are co-prime numbers (that is, their greatest common factor (GCF) is 1 and their lowest common multiple (LCM) is their product). Secondly, the co-prime pair is selected such that the two composite ULA's results in an array of a (sparse) aperture of the size equal to the LCM and of antenna elements equal to the number of physical Rx antenna elements plus 1. If such array is found, the composite-ULA array can then be repeated at every LCM elements by placing the MIMO TX's LCM elements apart.

For example, for a system of 8 physical Rx antennas and 2 Tx MIMO antennas, a co-prime pair {4, 5} is selected to form the composite-ULA sparse array based on the following arrangement. This is shown in the table below:

| Element position: | 0 4 5 8 10 12 15 16 20 |
|---|---|
| 4-element spacing ULA: | x _ _ _ x _ _ _ x _ _ _ x _ _ _ x _ _ _ x |
| 5-element spacing ULA: | x _ _ _ _ x _ _ _ _ x _ _ _ _ x _ _ _ _ x |
| {4, 5} Composite-ULA SPA: | o _ _ _ o o _ _ o _ o _ o _ _ _ o o _ _ _ o |
| Rx Element Index: | 1 2 3 4 5 6 7 8 9 |

The LCM of {4, 5} co-prime numbers is 20, so, by placing MIMO Tx (transmit, as opposed to Rx for receive) antennas at {0, 20, 40, . . . } element positions (i.e. integer multiples of LCM), the two ULAs can be naturally extended to form a larger composite-ULA sparse array. This requires careful selection of the co-prime pair. The case of 2 Tx {4, 5} co-prime sparse array can be constructed based on the following arrangement, where the locations of the Tx antennas is marked with 'T' and the locations of the Rx antennas are marked with 'R'. The constructed MIMO virtual antennas' locations are marked with 'V'. The virtual array may consist of 2 embedded ULAs of 4 and 5 element spacings, both with the same (sparse array) aperture size of 36 elements, as below.

| Position: | 0 _ _ _ _ _ _ _ _ _ _ _ _ _ _ _ 16 _ _ _ 20 _ _ _ _ _ _ _ _ _ _ _ _ _ _ _ 36 |
|---|---|
| Tx: | T _ _ _ _ _ _ _ _ _ _ _ _ _ _ _ _ _ _ _ T |
| Rx: | R _ _ _ _ R R _ _ R _ R _ R _ _ R R _ _ _ _ |
| Virtual: | V _ _ _ _ V V _ _ V _ V _ V _ _ V V _ _ _ _ V _ _ _ _ V V _ _ V _ V _ V _ _ V V |

Assuming half-wavelength element spacing, for a filled ULA the grating lobe occurs in the angle spectrum outside the +/−90° Field of view (FOV) so no ambiguity occurs. On the other hand, for the 4-element spacing ULA and the 5-element spacing ULA, grating lobe occurs within +/−90° FOV causing ambiguous sidelobes. The use of co-prime element spacings, however, effectively reduces the amplitude level of the ambiguous sidelobes because the centers of the grating lobes of the two co-prime ULAs do not coincide until many repeats of the spatially discretely sampled spectrums. Because the centers of the grating lobes from the two ULAs do not overlap, the composite grating lobes have a lowered amplitude level due to the limited lobe width. Further, not only the centers of the grating lobes do not overlap, the center of the grating lobe of the first ULA coincide with a null of the second ULA such that it is guaranteed that the power from the two ULAs do not coherently add up in the composite array. This directly results in the suppression of the grating lobes in the composite array. As more MIMO Tx's are employed to extend the ULAs, the lobe width is further reduced such that the composite grating lobe levels are further reduced. Thus, aspects of the present disclosure teach use of a sparse MIMO array construction method that is sure to reduce the ambiguous sidelobes (or composite grating lobes of the co-prime ULAs) and the sidelobe suppression performance scales with the number of MIMO Tx's employed. Note that when more MIMO Tx's are employed, the overlap of the grating lobes further decreases. The co-prime pair guarantees a suppression level of roughly 50%. Additional suppression can be achieved by further incorporating additional co-prime ULA(s). For example, {3, 4, 5} are co-prime triplets which suppresses grating lobes to roughly 30% of its original level. {3, 4, 5, 7} are co-prime quadruplets which suppresses grating lobes to roughly 25% of its original level, etc. The percentage of suppression corresponds to the ratio of the number of elements of a co-prime ULA and the total number of elements in the composite array.

Figure 3A:
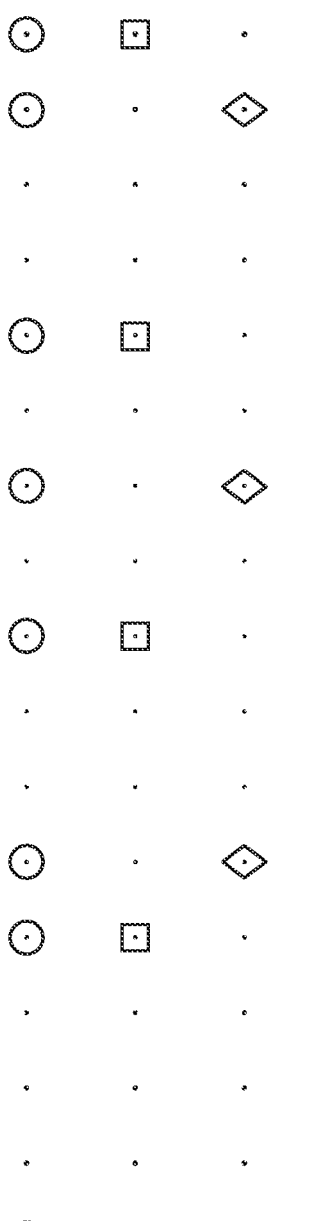
FIGS. 3A and 3B illustrate, respectively, a set of plots showing effective antenna spacings and a graph of normalized spatial frequency which may be associated with a system of the type implemented in a manner consistent with FIGS. 1A, 1B and/or 2 for illustrating aspects of the present disclosure in accordance with the present disclosure.
Figure 3B:
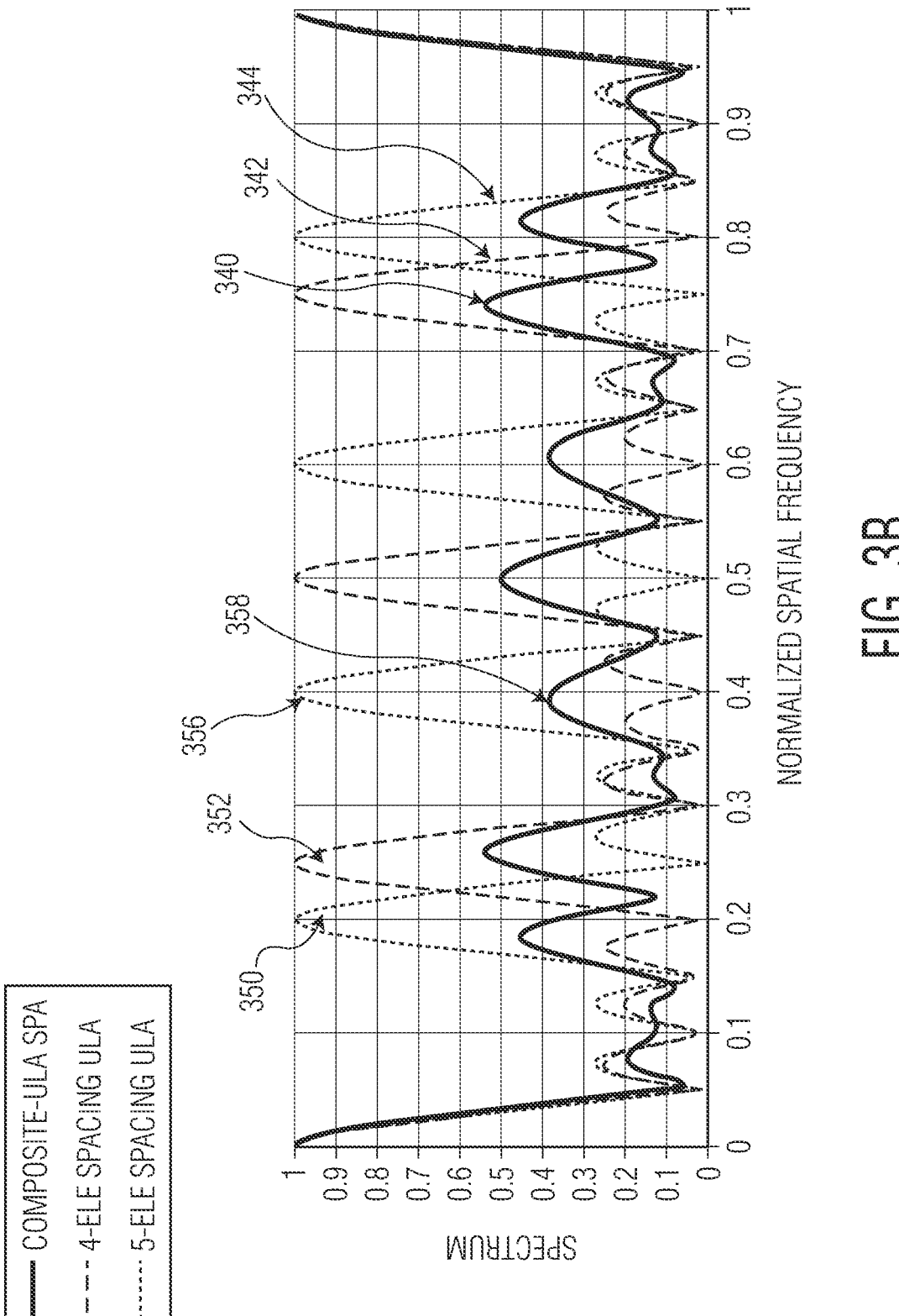
Figure 4A:
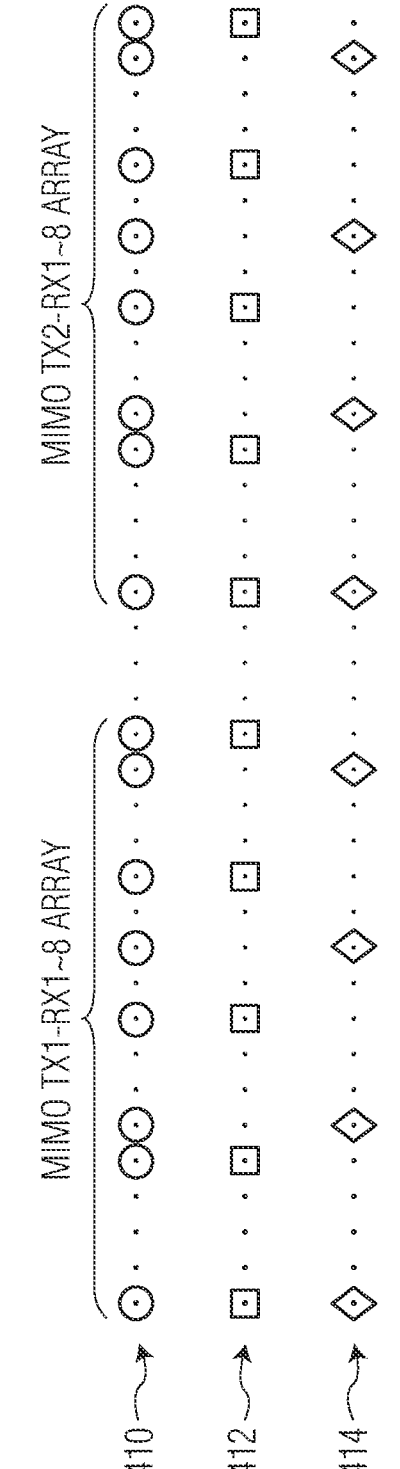
FIGS. 4A and 4B are respectively a different set of plots showing effective antenna spacings and a related graph of normalized spatial frequency, in accordance with the present disclosure.
Figure 4B:
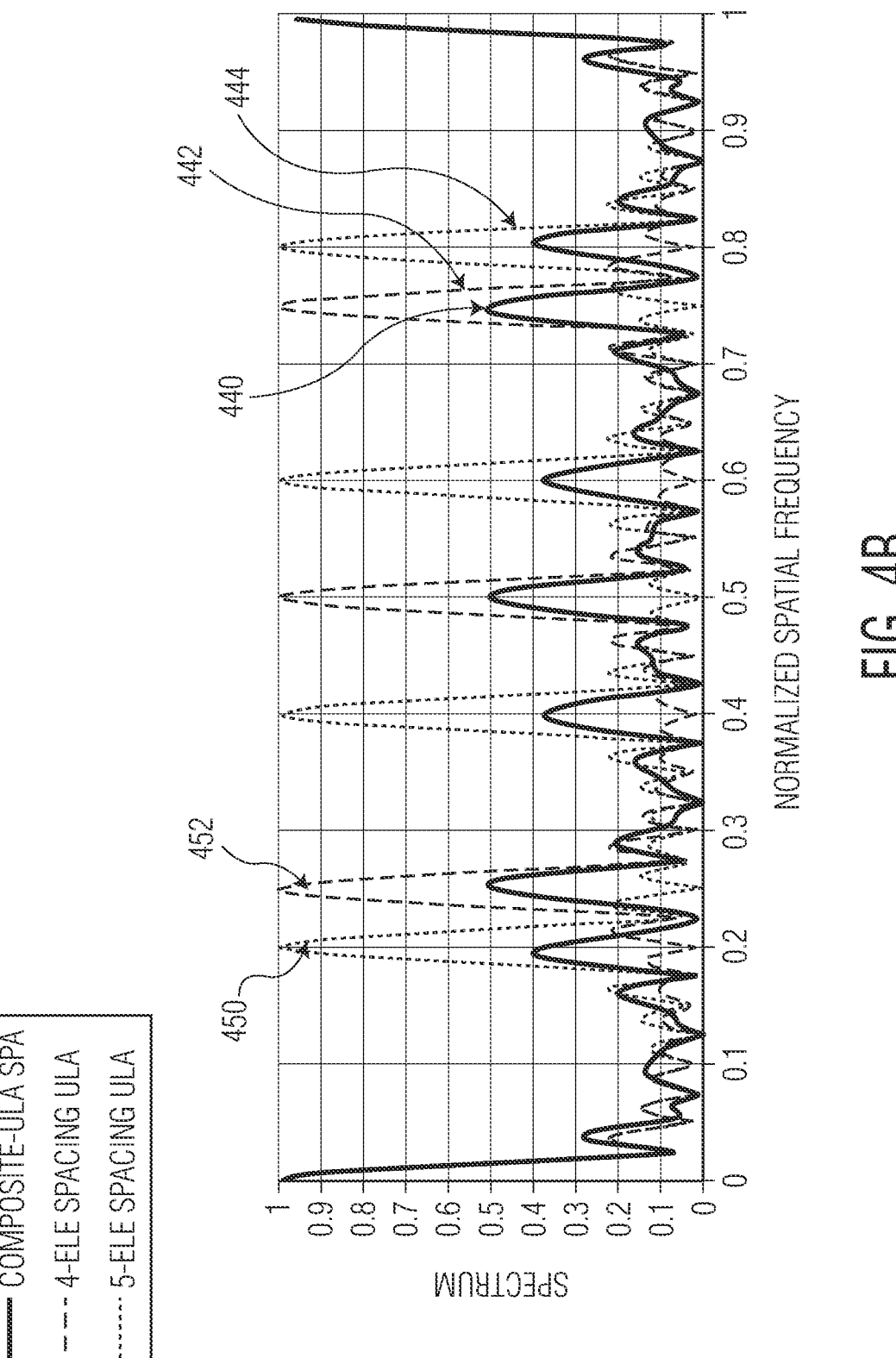

Further understanding of such aspects of the present disclosure may be understood by way of further specific (non-limiting) examples through which reference is again made to the spatial resolution spectrum but in these examples, with spatial frequency plots being normalized. These specific examples are shown in three pairs of figures identified as: FIGS. 3A and 3B; FIGS. 4A and 4B; and FIGS. 5A and 5B. For each pair of figures, the upper figure of the pair first shows the composite SPA with an effective random spacing as implemented by the following two or more ULA's for which the spacing values are based on the co-prime pairing or co-prime relationship as discussed above. The lower figure of the pair shows a plot of the relative measurements of the lobes positioned over a horizontal axis representing the normalized spatial frequency plots respectively corresponding to the composite SPA and its related ULA's with the noted spacings.

In FIGS. 3A and 3B, a {4, 5} co-prime sparse array of 8 elements is depicted. The composite SPA corresponds to spacing 310 and plot 340, and the two ULAs for which the antenna element spacing values are 4 (312) and 5 (314) are depicted as corresponding to plots 342 and 344. The co-prime ULA angle spectrums are illustrated in which the non-coincident grating lobes can be seen with partial overlap at 350 and 352 of FIG. 3B. It can also be observed that the grating lobes of one ULA coincides with nulls of the other ULA's (at 356 and 358 of FIG. 3B) showing significance of the sidelobe suppression effect. The resulting grating lobe in the composite array is about half of the origin amplitude.

FIGS. 4A and 4B illustrate a 2-Tx MIMO extended {4,5} co-prime sparse array which is used to produce a 16-element co-prime array. The 16-element co-prime array is realized using an extension of the co-prime ULAs by way of an additional MIMO (transmit array) as seen at the top of FIG. 4A. The composite SPA, having the additional MIMO, corresponds to spacing 410 and plot 440, and the two ULAs for which the antenna element spacing values are 4 (412) and 5 (414) are depicted as corresponding to plots 342 and 344. It can be seen that the grating lobe's beam width is halved (at 450 and 452) such that the amount of overlap is reduced. The resulting composite array angle spectrum not only has further suppressed grating lobes, but they are also more distinctly identifiable for resolving/mitigating false detections in connection with later sparse array processing steps.

Figure 5A:
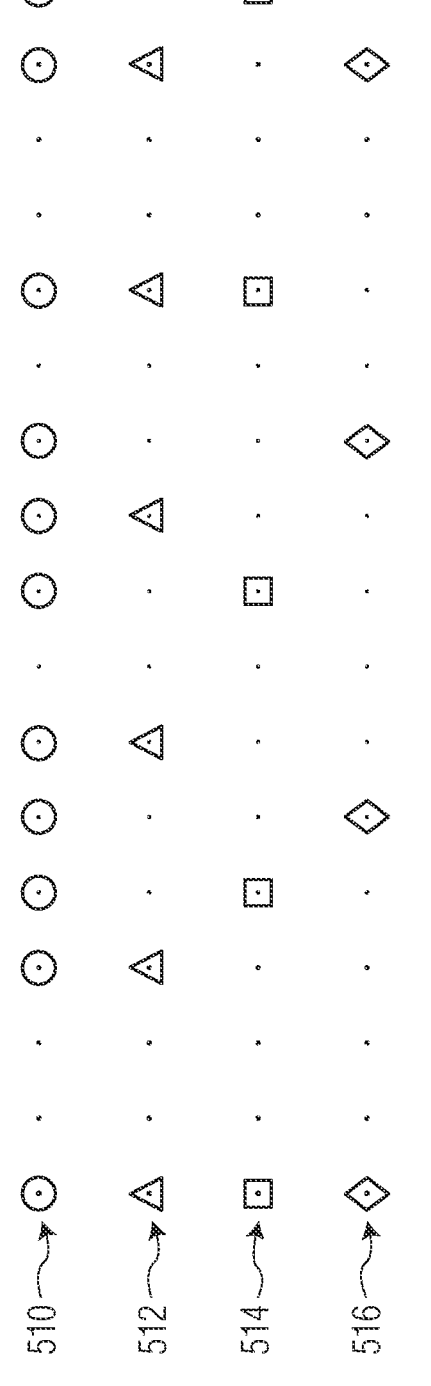
FIGS. 5A and 5B are respectively yet another set of plots showing effective antenna spacings and a related graph of normalized spatial frequency, in accordance with the present disclosure.
Figure 5B:
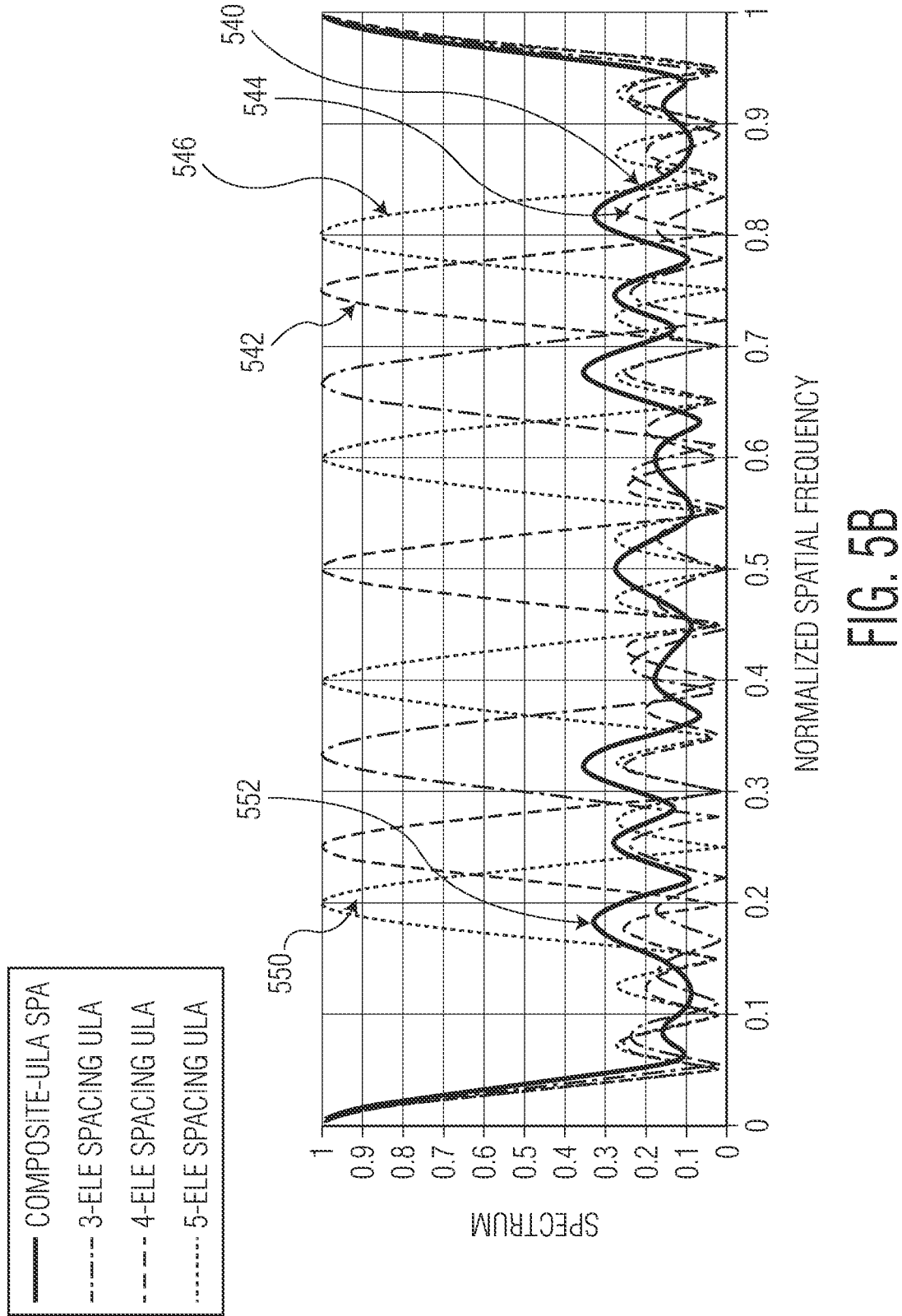

In FIGS. 5A and 5B, a {3, 4, 5} co-prime sparse array is illustrated which produces a 11-element co-prime array. It can be seen that the grating lobe's level is suppressed further (at 550 and 552) with this extension of a third sparse array. The composite SPA corresponds to spacing 510 and plot 540, and the three ULAs for which the antenna element spacing values are 3 (512), 4 (514) and 5 (516) are depicted as corresponding to plots 542, 544 and 546. The number of embedded sparse ULAs may include, for example, between three and six (or more) embedded sparse linear arrays In other examples, relative to the example of FIGS. 3A and 3B, the number of ULA' may be increased (as in FIGS. 5A and 5B) and the number of extension(s) may be increased (as in FIGS. 4A and 4B)

One may also compute individual co-prime ULA angle spectrums and detect angle-domain targets separately for each spectrum. In such an approach, only targets detected consistently in all co-prime ULA spectrums may be declared as being a valid target detection. In such an embodiment which is consistent with the present disclosure, the individual co-prime ULA's AoA spectrum are first produced and targets are identified as peaks above a predetermined threshold. Next, detected targets are check if they are present in the same angle bin in all co-prime ULAs' spectrums. If it is consistently detected in the same angle bin of all spectrums, a target is declared. Otherwise it is considered as a false detection and discarded.

In general, conventional processing for AoA estimation effectively corresponds to random spatial sampling and this leads to a sparse array design. It can be proven that the maximum spurious sidelobe level is proportional to the coherence so it follows that by designing a matrix A that has low coherence, this leads to low spurious sidelobes and vice versa. This demonstrates that by employing the extendable MIMO co-prime array approach of the present disclosure, reduced coherence can be achieved, and sparse recovery of targets can be obtained using greedy algorithms. In this context, such above-described MIMO array aspects are complemented by addressing the sparse spectral signal linear regression problem.

More specifically, to process the output of a sparse array, standard beamforming or Fourier spectral analysis based processing suffers due to the non-uniform spatial sampling which violates the Nyquist sampling rules. As a result, high spurious angle sidelobes will be present alone with the true target beams. To mitigate the spurious sidelobes, one may impose sparsity constraints on the angle spectrum outputs and solve the problem accordingly. One class of algorithms, based on so called greedy algorithms, originally developed for solving underdetermined linear problems, can be used for estimating the sparse spectrum output.

As is known the greedy algorithm starts by modelling the angle estimation problem as a linear regression problem, that is, by modelling the array output measurement vector x as a product of an array steering matrix A and a spatial frequency support amplitude vector c plus noise e, where each column of A is a steering vector of the array steered to a support spatial frequency $(f_1, f_1, \ldots f_M)$ in normalized unit (between 0 and 1) upon which one desires to evaluate the amplitude of a target and the spatial sampling positions $(t_1, t_1, \ldots t_N)$ in normalized integer units. To achieve high angular resolution, a large number of supports can be established, thereby dividing up the $0\sim2\pi$ radian frequency spectrum resulting in a fine grid and a "wide" A matrix (that is, number of columns, which corresponds to the number of supports, is much greater than the number of rows, which corresponds to the number of array outputs or measurements). Since A is a wide matrix, this implies that the number of unknowns (vector c) is greater than the number of knowns (vector x) and the solving of equation x=Ac+e is an under-determined linear regression problem, where x and e are N×1 vectors, A is a N×M matrix, and c is a M×1 vector. This is seen below as:

$$\begin{bmatrix} x_1 \\ \vdots \\ x_N \end{bmatrix} = \frac{1}{N} \begin{bmatrix} e^{j2\pi f_1 t_1} & e^{j2\pi f_2 t_1} & \ldots & e^{j2\pi f_{M-1} t_1} & e^{j2\pi f_M t_1} \\ e^{j2\pi f_1 t_2} & e^{j2\pi f_2 t_2} & \ldots & e^{j2\pi f_{M-1} t_2} & e^{j2\pi f_M t_2} \\ & & \vdots & & \\ e^{j2\pi f_1 t_N} & e^{j2\pi f_2 t_N} & \ldots & e^{j2\pi f_{M-1} t_N} & e^{j2\pi f_M t_N} \end{bmatrix} \begin{bmatrix} c_1 \\ c_2 \\ \vdots \\ c_{M-1} \\ c_M \end{bmatrix} + \begin{bmatrix} e_1 \\ \vdots \\ e_N \end{bmatrix}$$

Next, the greedy algorithm identifies one or more most probable supports and assuming one such most probable support, measures this support's most probable amplitude, and this is followed by cancellation of its contribution to the array output measurement vector to obtain a residual array measurement vector r. Based on the residual measurement vector, the process repeats until all supports are found or a stop criteria is met.

The identification of the most probably support (without loss of generality, assume one support is to be selected at a time) is by correlating the columns of A with measurement vector and support frequency that leads to the highest correlation is selected. The correlation vector, y, can be directly computed by $y=A^H x$ for the first iteration where $A^H$ denotes the transpose-conjugate (i.e. Hermitian transpose) of A. In general, for the k-th iteration, the correlation output is computed as $y=A^H r_k$ where $r_k$ is the residual measurement vector computed in the k−1-th iteration and $r_1=x$. The found support of the k-th iteration is then added to a solution support set $s \in \{i_1, i_2, \ldots i_k\}$.

The amplitude of the found support and the residual measurement vector can be obtained in any of various versatile ways. One known method, known as Matching Pursuit or MP, involves an iterative search through which the correlator peak's amplitude is found, and the amplitude is simply selected as the correlator peak's amplitude. Another known method, known as Orthogonal Matching Pursuit or OMP, in which a least-squares (LS) fitted solution is selected as the amplitude. The LS-fit is based on solving a new equation $x=A_s c_s$ in LS sense, where $A_s$ consists of columns of A of selected support set and elements of $c_s$ is a subset of elements of c of the selected supports. Once the amplitudes are found, the residual measurement vector is updated by $r_{k+1}=x-A_s \hat{c}_s$ where $\hat{c}_s$ is the LS solution of $c_s$. One solution to the LS problem is simply the pseudo inverse from which $\hat{c}_s$ is solved by $$\hat{c}_s = \left(A_s^H A_s\right)^{-1} A_s x$$

(for square or narrow matrix $$A_s) \text{ or } A_S^H \left(A_S A_S^H\right)^{-1} x$$

(for wide matrix $A_s$).

The MP and OMP method can be used to reconstruct the sparse spectrum c if a certain property of A is met. One of such widely used property is Coherence, μ(A), defined by the equation $$\mu(A) = \max_{1 \leq i, j \leq M} \frac{\left|A_i^H A_j\right|}{\|A_i\|_2 \|A_j\|_2},$$

where $A_i$ and $A_j$ are the i-th and the j-th column of A, respectively and in theory, $$\mu(A) \geq \sqrt{\frac{M-N}{N(M-1)}} \, .$$

According to the known theory, unique sparse reconstruction is guaranteed if $$\mu(A) < \frac{1}{2K-1}$$

where K denotes the number detectable targets (i.e. number of supports with amplitude above noise level). So, the lower the Coherence, the large value of K is possible. Note that unique reconstruction is possible if such condition is not met, only that it cannot be guaranteed based on the known theory.

In order to achieve high angular resolution, many supports much more than the number of measurements (i.e. N<<M) is modelled and estimated. This naturally leads to very high Coherence which in turn results in small K or recoverable target amplitudes. One way to reduce the Coherence is by randomizing the spatial sampling of the steering vectors. For example, one may create a N'×1 steering vector where N'>N, and randomly (following any sub-Gaussian or Gaussian probability distribution) deleting the samples to obtain a N×1 vector. The resulting matrix is called Random Fourier matrix. In the following equation, the matrix A represents such a Random Fourier matrix where $\{t_1, t_2, \ldots, t_N\}$ are N integers randomly selected from {0, 1, . . . , N'}.

$$x = Ac + e$$

$$\begin{bmatrix} x_1 \\ \vdots \\ x_N \end{bmatrix} = \frac{1}{N} \begin{bmatrix} e^{j2\pi f_1 t_1} & e^{j2\pi f_2 t_1} & \ldots & e^{j2\pi f_{M-1} t_1} & e^{j2\pi f_M t_1} \\ e^{j2\pi f_1 t_2} & e^{j2\pi f_2 t_2} & \ldots & e^{j2\pi f_{M-1} t_2} & e^{j2\pi f_M t_2} \\ & & \vdots & & \\ e^{j2\pi f_1 t_N} & e^{j2\pi f_2 t_N} & \ldots & e^{j2\pi f_{M-1} t_N} & e^{j2\pi f_M t_N} \end{bmatrix} \begin{bmatrix} c_1 \\ c_2 \\ \vdots \\ c_{M-1} \\ c_M \end{bmatrix} + \begin{bmatrix} e_1 \\ \vdots \\ e_N \end{bmatrix}$$

In general, the random spatial sampling requirement leads the sparse array design and it can be proven that the maximum spurious sidelobe level is proportional to the Coherence so by designing a matrix A that has low Coherence leads to low spurious sidelobes and vice versa. This demonstrates that by employing the extendable MIMO co-prime array approach of the present disclosure previously introduced, reduced Coherence can be achieved, and sparse recovery of targets can be obtained using greedy algorithms.

One problem with a greedy algorithm arises from the quantized supports on which target amplitudes are evaluated. Given finite quantization, which is necessary to keep coherence low, it is not possible to always have signals coincide exactly with the spatial frequency of the supports. When the actual spatial frequency misaligns with any of the supports, it may not be possible to cancel the target signal in its entirety in the residual measurement vector and as a result, neighboring supports are to be selected in order to cancel the signal in the later iteration(s). The resulting solution becomes non-sparse and the sparse recovery performance; thus, the resolution performance, is degraded.

Returning now to the AoA estimation determination and use of the iteratively-executed steps or actions to account for measurement error and noise, another aspect of the present disclosure involves an initialized array steering matrix used to model the angle estimation problem, and for which a solution may be provided through a sparse learning method which has a pruning action carried out in connection with each iteration to rule out supports that are of insignificant amplitude based on previous estimation of the spectrum amplitudes (e.g., as estimated in one or more of the immediately preceding iterations). According to examples of the present disclosure, aspects of the sparse learning methodology is best understood using certain probability theories which are common to Bayesian Linear Regression (BLR) approaches as discussed below.

In BLR, the problem of finding sparse c is modeled as the problem of finding the most probable values of c given the measurement x, corrupted by random noise ε. In other words, c is estimated by finding the values of c that maximize the posterior probability p(c|x), which can be casted into a simpler problem based on Bayesian theorem, following the max a posteriori (MAP) estimator approach shown as follows:

$$\hat{c} = \text{argmax}_c p(c \mid x) = \text{argmax}_c \frac{p(X \mid C) p(c)}{p(x)} = \text{argmax}_c \ln p(x \mid c) + \ln p(c).$$

In order to find solution of above problem, one may establish some prior knowledge on the probability distribution p(c) and p(x|c). For AoA estimation problems of radar systems, the conditional probability of p(x|c) carries the physical meaning of array measurement noise, which can be modeled as a joint distribution of i.i.d zero-mean Gaussian random variables. As to the selection of the distribution of p(c), there are a variety of a versatile of ways to model it such that the resulting estimate on c is sparse, and Sparse Bayesian Learning (SBL) is an example.

SBL models p(c) by introducing a latent random variable t such that the conditional probability p(c|τ) is a joint Gaussian distribution and further assuming that p(τ) itself is a Gamma distribution with parameters {α, β} whose value is chosen by the model designer. In the context of SBL, it is favorable to set {α, β}→{0,0} such that the resulting p(c) has a long-tail distribution having a general form of $$p(c) \propto \frac{1}{|c|}$$

which is robust to outliers thus it promotes sparse solutions (i.e. zero, i.e. noise, is the most probably value with or without the presence of outliers, i.e. target signals). The exact model of the SBL is provided below, with the measurement error being modeled as Gaussian:

$$p(x \mid c) = \left(\frac{1}{2\pi\sigma_n^2}\right)^{\frac{N}{2}} e^{-\frac{\|x - Ac\|_2^2}{2\sigma_n^2}}$$

The a priori distribution is modeled as a marginal distribution with the following form:

$$p(c) = \int_0^\infty p(c \mid \tau) p(\tau) d\tau$$

where $$p(c \mid \tau) = \frac{1}{\sqrt{(2\pi)^M \left|\sum_c^{-1}\right|}} e^{-\frac{c^H \sum_c c}{2}}$$

$$\sum_c = \mathrm{diag}(\tau)$$

$$p(\tau) = \frac{\beta^\alpha}{\Gamma(\alpha)} \tau^{\alpha-1} e^{-\beta\tau}$$

such that elements of c follows the Student's t distribution, $$p(c) = \frac{\beta^\alpha \Gamma(\alpha + 0.5)}{\sqrt{2\pi}\,\Gamma(\alpha)} \left(\beta + \frac{c^2}{2}\right)^{-(\alpha + 0.5)}$$

which tends to the form $$\frac{1}{|c|}$$

when $\alpha \to 0$, $\beta \to 0$.

With reference to the above relationships, $\hat{c} = \arg\max_c \ln p(x|c) + \ln p(c)$ may be solved using above definitions. One may compute the derivative of $\ln p(y|c) + \ln p(c)$ w.r.t c and set it to zero such that c can be found, along with distribution parameters $$\sigma_n^2$$

and $\tau$ also found through maximizing $$p(y; \tau, \sigma_n^2)$$

In certain more specific examples and while detailed derivations may be known, $\hat{c}$ may be iteratively found by sequentially updating equations as below with initial values of $\hat{c}$ set according to an FFT beamforming result, $$\hat{\sigma}_n^2$$

set to a value close to noise variance and wherein $\hat{\tau}_i$ is set to suitable identical values such that it cannot be neglected in $\Omega$ nor does it dominates $\Omega$.

Update covariance of $c$ given $y$: $\Omega = \left(\frac{1}{\hat{\sigma}_n^2} A^H A + \sum_c\right)^{-1}$ Update mean of $c$ given $y$(output spectrum): $\hat{c} = \frac{1}{\hat{\sigma}_n^2} \Omega A^H x$ Update noise variance: $\hat{\sigma}_n^2 = \frac{\|x - A\hat{c}\|_2^2}{N - Tr\left(I - \Omega \sum_c\right)}$ Update precision vector: $\hat{\tau}_i = \frac{1 - \hat{\tau}_i \Omega_{ii}}{\left(\hat{c}\hat{c}^H\right)_{ii}} \to \sum_c = \mathrm{diag}(\hat{\tau})$ Disadvantages in using SBL are well known and they include its performance. As an example, SBL requires an inversion step in the $\Omega$ update and this inversion often leads to numerical problems when $$\hat{\sigma}_n^2$$

tends towards small values. When this occurs, the low rank $A^H A$ term dominates the expression which results in a rank deficiency problem for the matrix inverse. Secondly, the M×M matrix to be inverted can be very large and this results in computation efficiency being correspondingly low.

Certain aspects of the present disclosure may be used to mitigate such disadvantages of SBL, and one, as mentioned above, is the pruning action carried out in connection with each iteration to rule out supports that are of insignificant amplitude. This may be based on one or more previous estimations of the spectrum amplitudes. The effect is a result which decreases the size of the problem monotonically with each new iteration. In turn, this reduces the computation burden and also well reduces the sensitivity to the rank deficiency problem.

Further, in a typical implementation according to the present disclosure, there is no matrix inversion step as such. Rather, instead of a matrix inversion step as above, Cholesky decomposition is used to take advantage of the structure of the underlying matrix to be inverted such that the speed increases and the computation is more robust against numerical issues. The enhanced solution is described in the below equations where $\hat{c}_p$ is the amplitude after the pruning and $A_p$ is the corresponding steering vector matrix of the pruned support. Matrix U is the upper triangular matrix based on the Cholesky decomposition.

Cholesky decompose objective matrix: $U = Cholesky\left\{\frac{1}{\hat{\sigma}_n^2} A_p^H A_p + \sum_c\right\}$ Update covariance of $c$ given $y$: $\Omega_p = U^{-1}\left(U^H\right)^{-1}$ Update mean of $c$ given $y$(output spectrum): $\hat{c}_p = \frac{1}{\hat{\sigma}_n^2} \Omega_p A_p^H x$ Update noise variance: $\hat{\sigma}_n^2 = \frac{\|x - A_p\hat{c}_p\|_2^2}{N - Tr\left(I - \Omega_p \sum_c\right)}$ Update precision vector: $\hat{\tau}_{p,i} = \frac{1 - \hat{\tau}_i \Omega_{p,ii}}{\left(\hat{c}_p\hat{c}_p^H\right)_{ii}} \to \sum_c = \mathrm{diag}(\hat{\tau}_p)$ As an illustration in accordance with yet a specific example, the present disclosure includes FIG. 6 as a flow chart showing one example manner for implementing such methodology. Again, these operations may be implemented by logic circuitry such as in the AoA-related module shown at the lower right of FIG. 1A and/or FIG. 1B, assuming the circuits being used align these illustrated examples. In other examples according to the present disclosure, such aspects may be implemented in different manners such as in circuits external to the radar front end circuitry and/or in a manner integrated with such above-described and other aspects and actions.

For purposes of understanding some of the terminology, this flow in FIG. 6 pertains to the above type of steering vector matrix $A_p$ of full supports. In practice, the entire matrix need not to be precomputed and stored and can be generated on the fly and/or on demand. This specific example process may be carried out as follows.

At the top of FIG. 6, flow begins at block 610 with initialization of a count variable p which may be used to track the iterations or times through the flow of FIG. 6 and which may be reset to 0, and an initialization of certain vector-related parameters to be updated which, in this example, are: the noise variance parameter, the precision vector, and the output support amplitude vector $\hat{c}_p$ (to be the amplitude after the pruning) which is initialized to $$A_p^H x.$$

As should be apparent, these vector-related parameters to be updated refer to the variables, terms and mathematical relationships as discussed above in connection with the related aspects of the present disclosure.

The next several blocks of FIG. 6 are performed, in this example, before the flow would generate an output or report of a determination of the AoA. Accordingly, from block 610, flow proceeds to block 620 where vector supports are pruned as indicated above and in the illustrated block 620. From block 620, flow proceeds to block 625 where the objective matrix is simplified via a Cholesky decomposition, as above and illustrated. From block 625, flow proceeds to block 630 where the logic circuitry updates the covariance of the output support amplitude vector as indicated and illustrated. From block 630, flow proceeds to block 640 where the logic circuitry updates the support amplitude vector $\hat{c}_p$ as indicated and illustrated. From block 640, flow proceeds to block 650 where the logic circuit computes the normalized residual $r_p$ based on an absolute value associated with the above updates and processing, and this is where a residual vector may be stored for a comparison step in connection with the determination associated with the next block 660. This residual vector may be used to reflect measurement error taken from a Gaussian distribution.

In block 660, a decision is made based on whether the residual vector has been reduced below a minimum residual threshold $r_{TH}$ or whether a maximum iteration count threshold for the count p is equal to $p_{max}$. This decision is processed to assess whether a stop criteria is realized (in this example, the thresholds $p_{max}$ and $r_{TH}$). If either of these conditions is met, flow proceeds from block 660 to block 665 where the logic or computer circuitry effects a report as noted above; otherwise, flow proceeds from block 660 to block 670 where the noise variance parameter is updated as indicated and illustrated in block 670.

From block 670, flow proceeds to block 680 where the precision vector, as yet another parameter, is updated as indicated and illustrated in block 680. Next, at block 690, the count p is incremented and flow returns to block 620 supports being pruned for the next iteration in the flow shown in this example of FIG. 6.

In example experimental and/or simulation-based implementations, consistent with the above aspects of the present disclosure, AoA estimation results have been obtained for two type of virtual (e.g., MIMO) arrays: a 16-element {4,5} co-prime sparse array and a 16-element uniform linear array (ULA). The results show that the targets may be resolved using either array configuration. When the sparse array is used, better resolution performance is shown to be usually achieved. When ULA is used, the performance loss is observed however it is not lost entirely like greedy algorithm methods. This demonstrates that such aspects of the present disclosure result in superior sparse spectral signal reconstruction. From these implementations, such results also show that the spectral peaks are generally wider than other greedy algorithms and, depending on the greedy algorithm, this may be due to its probabilistic modelling of the spectrum amplitudes.

For a simulated example in which 6 targets are present, FIG. 7A and FIG. 7B illustrate the number of supports solved in each iteration for a conventional SBL approach (FIG. 7A) and a pruning-type sparse learning (FIG. 7B) as discussed in connection with the above aspects of the present disclosure. The number of supports are pruned for the case of pruning-type sparse learning (FIG. 7B) and it is monotonically reduced from 256 to 26 which means that the matrix that may be inverted (for the case of the SBL approach) or Cholesky decomposed (for the case of pruning-type sparse learning of FIG. 7B) can differ by as much as 10 times, resulting in difference in computation as much as 1000 times (based on $O\{n^3\}$) in the final iterations. The use of Cholesky decomposition (sometimes QR decomposition) can be more efficient (depending on the implementation) and it also reduces the sensitivity to rank deficiency so in general the robustness of the present disclosure is improved.

Accordingly in accordance with the present disclosure, such a pruning-type sparse learning method may be applied for processing output data indicative of reflection signals passed from a sparse array, and such an array may be in any of a variety of different forms such as those disclosed as above. In each instance, the logic (or processing) circuitry receives the output data as being indicative of signal magnitude (e.g., in a spectrum support vector) of the reflection signals via the sparse array, and then discerns angle-of-arrival information for the output data by performing certain steps in an iterative manner for implementation of a sparse learning method which includes pruning, for each iterative update, certain of the plurality of spectrum-related support vectors having respective amplitudes which are insignificant relative to the statistical expectation of the support vector in a preceding iteration.

In certain more-specific examples according to the present disclosure, these steps include updating of a set of support-vector parameters including a covariance estimate of the support vector, and a statistical expectation of the support vector over a plurality of spectrum-related support vectors (e.g., mean). In related more-specific examples, the above-noted set of parameters to be updated with each iteration (e.g., associated with previous values of the support vector) may include a covariance estimate of the support vector, a statistical expectation of the support vector over a plurality of spectrum-related support vectors, a noise variance associated with the most recent refinement of the support vector, and a scaling parameter such as $\tau$ as exemplified above. Further and as applicable to each such example, to reduce further computational burdens which may be significant for many computer-circuit architectures, the matrix-based model may also be processed by Cholesky decomposition with each iterative update.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, etc. and/or other circuit-type depictions. Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing such activities and/or steps associated with the above-discussed functionalities. In other examples, the logic circuitry may carry out a process or method by performing these same activities/operations and in addition.

For example, in certain of the above-discussed embodiments, one or more modules are discrete logic circuits or programmable logic circuits configured and arranged for implementing these operations/activities, as may be carried out in the approaches shown in the signal/data flow of FIGS. 1A, 1B and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first" type of structure, a "second" type of structure, where the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
a radar circuit to receive reflection signals, in response to transmitted radar signals, as reflections from objects; and
computer processing circuitry to process data corresponding to the reflection signals via a memory array and, in response, to generate output data indicative of signal magnitude associated with the reflection signals, and to discern angle-of-arrival information for the output data by correlating the output data with an iteratively-refined estimate of a sparse spatial frequency support vector ("support vector") indicative of a correlation peak for the output data, the iteratively-refined estimate generated by:
iteratively updating of a set of parameters associated with previous values of the support vector including a covariance estimate of the support vector, and a statistical expectation of the support vector over a plurality of spectrum-related support vectors; and
pruning, for each iterative update, certain of the plurality of spectrum-related support vectors having respective amplitudes which are less than the statistical expectation of the support vector derived in a preceding iteration.

2. The apparatus of claim 1, wherein the sparse spatial frequency support vector is processed as a random variable using a matrix-based model, and wherein the matrix-based model is processed by Cholesky decomposition with each iterative update.

3. The apparatus of claim 1, wherein the set of parameters includes a noise variance parameter, wherein the sparse spatial frequency support vector is processed as a random variable using a matrix-based model, and wherein the steps are carried out sequentially, without inversion of a matrix in the matrix-based model, with the update of the statistical expectation of the support vector following the update of the covariance estimate of the support vector, and an update of the noise variance parameter following the update of the statistical expectation of the support vector.

4. The apparatus of claim 1, wherein the set of parameters includes a noise variance parameter and further includes a precision vector associated with a random variable $\tau$ such that a conditional probability of the support vector in a current iterative update, given $\tau$, is a joint Gaussian distribution, and a conditional probability of $\tau$ itself is a Gamma distribution with multiple parameters chosen to promote sparse outcomes for the iteratively-refined estimate.

5. The apparatus of claim 4, wherein the iterative updating of the set of parameters is carried out over an increasing iteration count which stops as a function of the multiple parameters.

6. The apparatus of claim 1, wherein the iterative updating of the set of parameters is carried out over an increasing iteration count which stops as a function of a measurement error having a Gaussian distribution.

7. The apparatus of claim 6, wherein the measurement error corresponds to a probability of error given the support vector after its most recent iterative update.

8. The apparatus of claim 1, wherein the computer processing circuitry is to iteratively update the set of parameters over an increasing iteration count which ceases upon reaching or satisfying a threshold criteria and, in response, to the threshold criteria, generate resultant data corresponding to the discerned angle-of-arrival information for the output data.

9. The apparatus of claim 1, wherein the statistical expectation corresponds to a mean, or average of the plurality of spectrum-related support vectors associated with a current iteration.

10. The apparatus of claim 1, wherein the statistical expectation corresponds to a range corresponding to a subset of the plurality of spectrum-related support vectors associated with a current iteration, wherein the subset accounts for or includes a mean.

11. The apparatus of claim 1, wherein the memory array is or includes a multi-input multi-output virtual array has at least one embedded uniform sparse linear arrays being associated with a unique antenna-element spacing.

12. The apparatus of claim 1, wherein the memory array is or includes a multi-input multi-output virtual array having at least two embedded uniform sparse linear arrays, each of which is being associated with a unique antenna-element spacing from among a set of unique co-prime antenna-element spacings.

13. The apparatus of claim 1, wherein the radar circuit includes sets antenna elements spaced for radar signal transmissions and in response, reception of reflections from the radar signal transmissions.

14. The apparatus of claim 1, wherein the radar circuit includes front-end analog circuitry for radar signal transmissions and in response, reception of reflections from the radar signal transmissions, and further includes analog-to-digital and/or digital-to-analog conversion circuitry to communicatively couple the front-end analog circuitry with the computer processing circuitry.

15. In a radar system circuit including a logic circuit with a memory hosting a memory array in which radar reflection signals are processed, a computer-implemented method comprising:

generating, via the logic circuit, output data indicative of signal magnitude associated with the reflection signals, and discerning angle-of-arrival information for the output data for the output data by correlating the output data with an iteratively-refined estimate of a sparse spatial frequency support vector ("support vector") indicative of a correlation peak for the output data, the iteratively-refined estimate generated by:

iteratively updating of a set of parameters associated with previous values of the support vector including a covariance estimate of the support vector, and a statistical expectation of the support vector over a plurality of spectrum-related support vectors; and pruning, for each iterative update, certain of the plurality of spectrum-related support vectors having respective amplitudes which are less than the statistical expectation of the support vector of in a preceding iteration.

16. For use in an apparatus which includes a radar circuit and computer processing circuitry, a method comprising:

receiving, in response to transmitted radar signals, reflection signals as reflections from objects; and in the computer processing circuitry, processing data corresponding to the reflection signals via a memory array, generating, in response, output data indicative of signal magnitude associated with the reflection signals, and discerning angle-of-arrival information for the output data for the output data by correlating the output data with an iteratively-refined estimate of a sparse spatial frequency support vector ("support vector") indicative of a correlation peak for the output data, the iteratively-refined estimate generated by:

iteratively updating of a set of parameters associated with previous values of the support vector including a covariance estimate of the support vector, and a statistical expectation of the support vector over a plurality of spectrum-related support vectors; and pruning, for each iterative update, certain of the plurality of spectrum-related support vectors having respective amplitudes which are less than the statistical expectation of the support vector of in a preceding iteration.

17. The method of claim 16, wherein the sparse spatial frequency support vector is processed as a random variable using a matrix-based model or mathematical relationship, and wherein the matrix-based model is processed by Cholesky decomposition with each iterative update.

18. The method of claim 16, wherein the steps of processing, generating, discerning, iteratively updating and pruning are carried out sequentially with the update of the statistical expectation of the support vector following the update of the covariance estimate of the support vector, and an update of a noise variance parameter following the update of the statistical expectation of the support vector.

19. The method of claim 16, wherein the set of parameters includes a noise variance parameter, and further includes a precision vector associated with a random variable $\tau$ such that a conditional probability of the support vector in a current iterative update, given $\tau$, is a joint Gaussian distribution, and a conditional probability of $\tau$ itself is a Gamma distribution with multiple parameters chosen to promote sparse outcomes for the iteratively-refined estimate.

20. The method of claim 19, wherein the iterative updating of the set of parameters is carried out over an increasing iteration count which stops as a function of the multiple parameters.

\* \* \* \* \*